United States Patent [19]

Tanuma et al.

[11] Patent Number: 4,818,129
[45] Date of Patent: Apr. 4, 1989

[54] METHOD FOR CORRECTING BIDIRECTIONAL PRINTING ALIGNMENT OF A SERIAL DOT PRINTER

[75] Inventors: Jiro Tanuma; Kuniharu Hayashi; Shinichi Katakura; Hiroshi Sakaino, all of Tokyo, Japan

[73] Assignee: Oki Electric Industry Co., Ltd., Tokyo, Japan

[21] Appl. No.: 103,824

[22] Filed: Oct. 2, 1987

[30] Foreign Application Priority Data

Oct. 9, 1986 [JP] Japan .................................. 61-239218

[51] Int. Cl.$^4$ ............................................. B41J 19/30
[52] U.S. Cl. ..................................... 400/323; 400/53; 400/303; 400/121
[58] Field of Search .................... 400/53, 121, 61, 279, 400/320, 322, 323, 303, 305; 364/518, 519

[56] References Cited

U.S. PATENT DOCUMENTS

| | | | |
|---|---|---|---|
| 4,051,945 | 10/1977 | Fujimoto | 400/322 X |
| 4,210,404 | 7/1980 | Hanger | 400/124 |
| 4,460,968 | 7/1984 | Cavill et al. | 364/519 |
| 4,517,503 | 5/1985 | Lin et al. | 318/561 |

FOREIGN PATENT DOCUMENTS 57-45070  3/1982  Japan .................................. 400/322

OTHER PUBLICATIONS

Patent Abstracts of Japan, unexamined applications, field M, vol. 6, No. 167, Aug. 31, 1982, p. 145 M 153 * Kokai-no. 57-82 071 (Tokyo Shibaura Denki) * (Abstract only).

*Primary Examiner*—Paul T. Sewell
*Attorney, Agent, or Firm*—Wenderoth, Lind & Ponack

[57] ABSTRACT

In a method for operating a serial dot matrix printer having a print head that is reciprocated along a first direction and stopped for performing bi-directional printing on a medium that is moved in a second direction orthogonal to the first direction, correction amounts for correcting the bi-directional printing alignment are stored in a memory device. The desire correction amount is then selected and stored in a battery-backed-up memory. The bi-directional printing then is performed using the desired correction amount stored in the battery-backed-up memory.

4 Claims, 8 Drawing Sheets

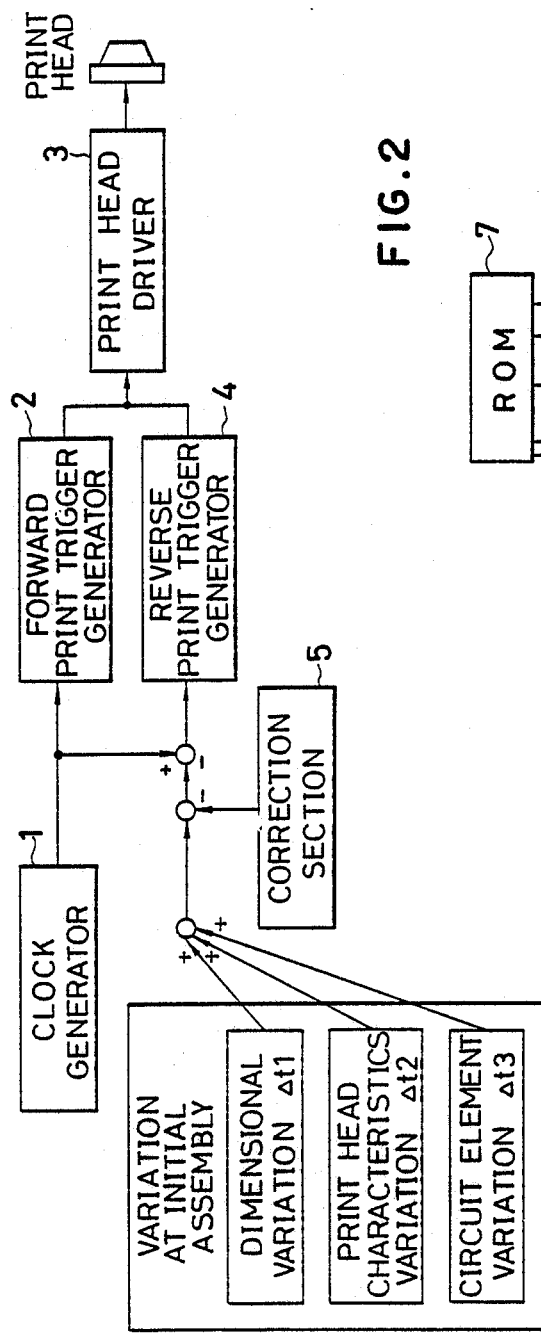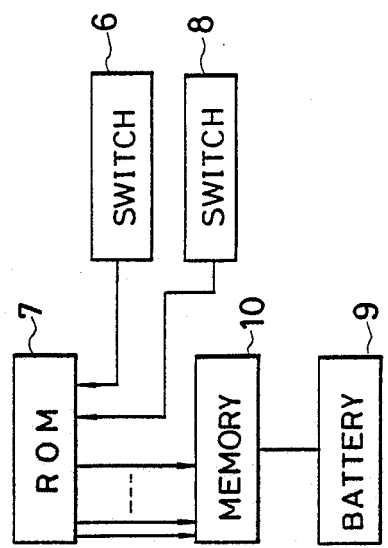

CHARACTER PITCH

LINE SPACING

PRINT REGISTRATION

CORRECTION        0

CORRECTION        −1

CORRECTION        −2

CORRECTION        −3

CORRECTION        +1

CORRECTION        +2

CORRECTION        +3

METHOD FOR CORRECTING BIDIRECTIONAL PRINTING ALIGNMENT OF A SERIAL DOT PRINTER

BACKGROUND OF THE INVENTION

This invention relates to a method for correcting the bidirectional printing alignment of a serial dot matrix printer.

A serial dot matrix printer prints on a medium by means of a print head that moves laterally and stops in a cyclical manner. Known causes of misalignment of the printed pattern in bidirectional printing (i.e., misalignment between positions of printing during lateral movement in one direction and during lateral movement in the other direction) include variations in the backlash of the gears in the drive mechanism, variations in the speed of motion of the carriage due to nonuniformity of parts (e.g., variation in rack pitch), and changes in the acceleration and deceleration time of the carriage motor (space motor) due to variations in the characteristics of circuit elements.

A system that has been adopted to correct such misalignment changes the read-only memory data with regard to the printing timing, as disclosed in Japanese Patent Application Laying-open No. 45070/1982.

A problem with the above system is that, since every printer has a different degree of misalignment, the alignment cannot be successfully corrected unless several types of read-only memories incorporating different correction amounts are provided.

Another problem is the difficulty of readjustment if the printing alignment is lost because of changes due to aging after the printer is in the possession of the user. The user cannot easily change the read-only memory data, nor is it customary for the user to keep a supply of read-only memories with different correction amounts written therein.

SUMMARY OF THE INVENTION

An object of the present invention is to solve the above problems.

Another object of the present invention is to minimize the bidirectional printing misalignment with a simple configuration.

In this invention, the bidirectional printing alignment of a serial dot matrix printer that prints on a medium by means of a print head that moves laterally and stops in a cyclical manner is corrected using data (correction amount) stored in a battery-backed-up memory. The data used for the correction can be rewritten when the amount of required correction is found to be inappropriate or is found to have become inappropriate (due, for example, to aging changes).

The above method enables correctly-aligned printing to be obtained through switch operations for making selection among correction amounts stored in the memory. The correction amount that is considered appropriate is selected for use in correction of the alignment. Misalignment may be caused by dimensional variations, variations in print-head characteristics, variations in circuit elements, and aging changes. Misalignment due to dimensional variations, variations in print-head characteristics, and circuit element variations are corrected in this way when the printer is first assembled. Misalignment arising from aging changes is corrected by reselecting the correction amount when the misalignment problem occurs.

BRIEF DESCRIPTION OF THE DRAWINGS

FIG. 1 is a block diagram showing a first embodiment of the invention.

FIG. 2 is a block diagram showing an example of the correction section shown in FIG. 1.

DETAILED DESCRIPTION OF THE EMBODIMENTS

Embodiments of this invention will next be described with reference to the drawings.

Figure 3:
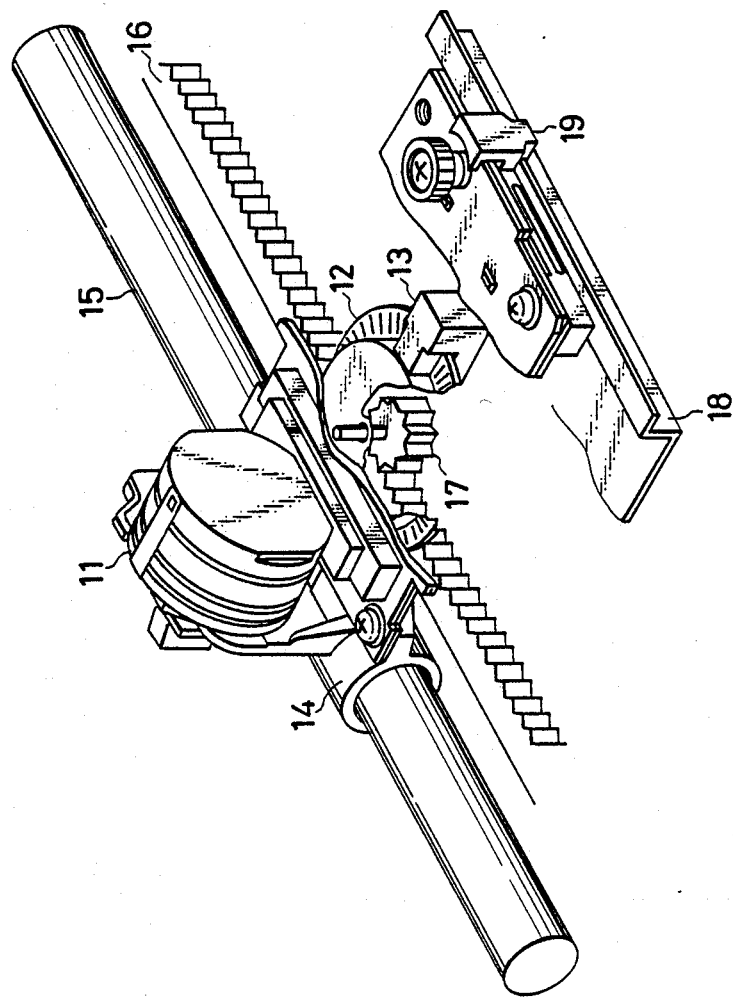
FIG. 3 is an oblique view of the print-head assembly.
Figure 5:
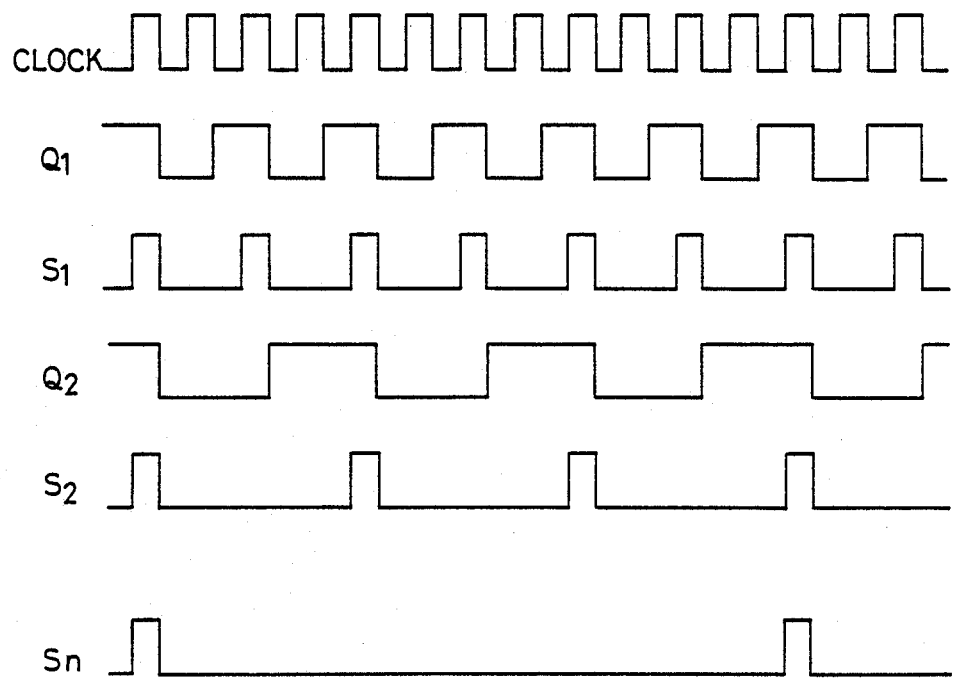
FIG. 5 is a timing chart showing the counting of clock pulses and the output of a trigger signal.

FIG. 1 is a block diagram of the first embodiment. In forward printing, a clock signal shown in FIG. 5 is first generated by a clock generator 1. The clock generator 1 can be any device that operates through the lateral motion of the print head: by means, for example, of an encoder 12 and photosensor 13 on the motor (space motor) that moves the print head 11 laterally, as shown in the oblique view in FIG. 3. The other components shown in FIG. 3 are a carriage frame 14, a carriage shaft 15, a space rack 16, a motor gear 17, a baseplate 18, and a slider 19.

The clock signal is next fed to a forward print trigger generator 2, which outputs a print trigger signal at a given timing. This forward print trigger generator 2 can be any device that counts clock pulses and generates a trigger signal every predetermined count. For example, it can be a combination of flip-flop and AND gates like that shown in FIG. 4. The print trigger signal is applied to a print-head driver 3 comprising resistors, capacitors, transistors, and other elements to carry out the printing operation.

In reverse printing, the clock signal is fed to a reverse print trigger generator 4, which outputs a print trigger signal at a given timing. The reverse print trigger generator 4 can be any device capable of altering the clock count from the stopped position to the first trigger position by a correction value $\Delta t_4$ that is supplied from the correction sections 5.

Figure 4:
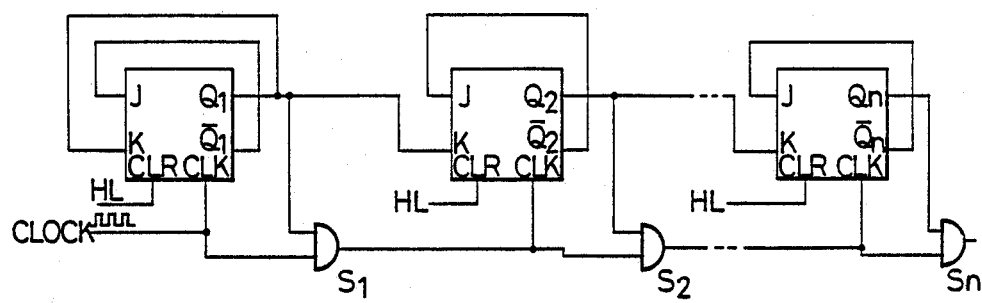
FIG. 4 is a block diagram showing part of an example of a forward print trigger generator.

For instance, the reverse print trigger generator 4 comprises a combination of the flip-flop and AND gates similar to that shown in FIG. 4 and a pulse counting circuit connected at the input of the above combination. The pulse counting circuit counts the pulses from the clock generator 1 at the start of lateral movement so that the number of pluses the clock generator 1 must produce before the first trigger is made is altered depending on the number of pulses counted which in turn is dependent on the correction amount.

Figure 6:
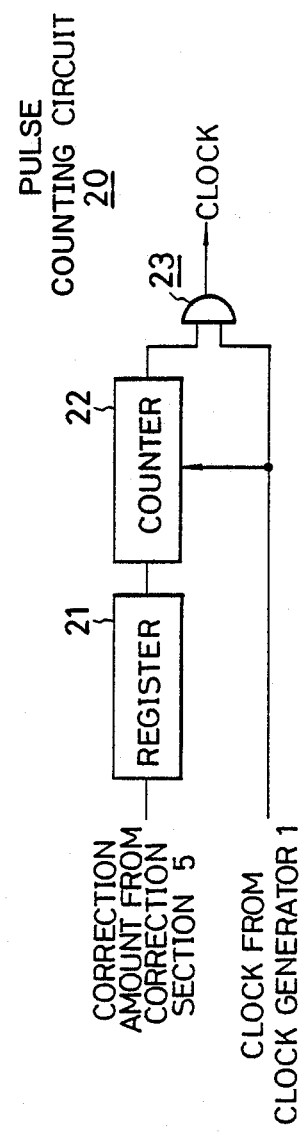
FIG. 6 is a block diagram showing an example of the pulse counting circuit.

An example of the pulse counting circuit 20 is schematically shown in FIG. 6. As illustrated it comprises a register 21 in which the correction amount (or a number of pulses corresponding to the correction amount) is fed from the correction section 5 and stored. A counter 22 counts the clock signal from the clock generator 1 and produces a low-level signal until the number of pulses fed from the clock generator reaches the value as stored in the register 21, after which an AND gate 23 is opened. The output of the AND gate is applied to the combination of flip-flop and AND gates similar to that shown in FIG. 4.

The correction value $\Delta t_4$ must conform to the sum of the amounts of misalignment due to various factors. FIG. 1 assumes a situation where the misalignment is due to the following factors.

$\Delta t_1$: the reverse printing misalignment, measured in seconds, caused by dimensional variations. For example, by variations in the gap, which cause differences in the time taken for the wires to reach the platen.

$\Delta t_2$: the misalignment, measured in seconds, caused by variations in print-head characteristics, for example by variations in the time required to release the wires, due to differences in attractive magnetic force.

$\Delta t_3$: the misalignment, measured in seconds, caused by variations in circuit elements. For example, variations in the values of resistors which cause variations in drive time.

The sum $(\Delta t_1 + \Delta t_2 + \Delta t_3)$ is the misalignment that arises in the forward direction, measured in seconds.

A correction amount of $\Delta t_4 = -(\Delta t_1 + \Delta t_2 + \Delta t_3)$ seconds should therefore be added by the correction section 5. The correction section 5 can be configured as shown in the block diagram in FIG. 2. When switch 6 is pressed, correction amounts stored in a read-only memory 7 are individually read and printed one at a time on a sheet and then fed (line-fed) out so that the printed part can be seen by the operator immediately after the printing. When the desired correction amount, or the correction amount that is considered most appropriate is printed, another switch 8 in pressed to write the selected correction amount is a battery-back-up memory 10 (replacing any prior correction amount).

Figure 7:
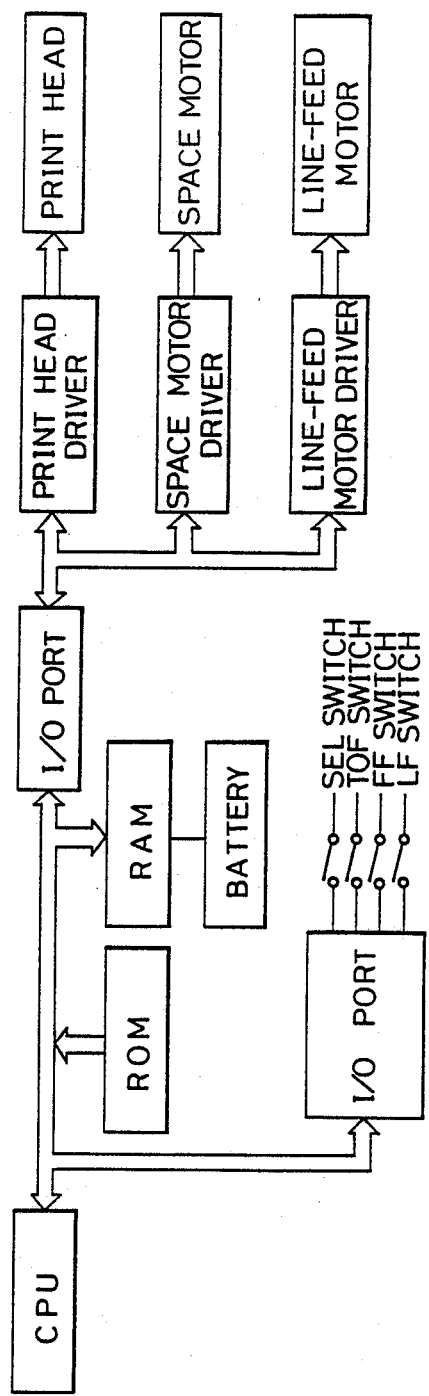
FIG. 7 is a block diagram showing a hardware construction of the control system of the printer.

FIG. 7 shows a hardware configuration of the control system of the printer. ROM stores programs as well as a table of correction amounts and other fixed data that are used for control of the printer. RAM is backed up by a battery and stores the correction amount that has been considered most appropriate. The print-head driver, the space motor driver and the line-feed motor driver are connected via an I/O port. Several switches, including the SEL switch, the TOF switch, the FF switch and the LF switch are also connected via an I/O port. The CPU operates under control of the programs store in the ROM and in accordance with data derived from the switches and sensors, not shown, located in various parts of the printers.

Figure 8:
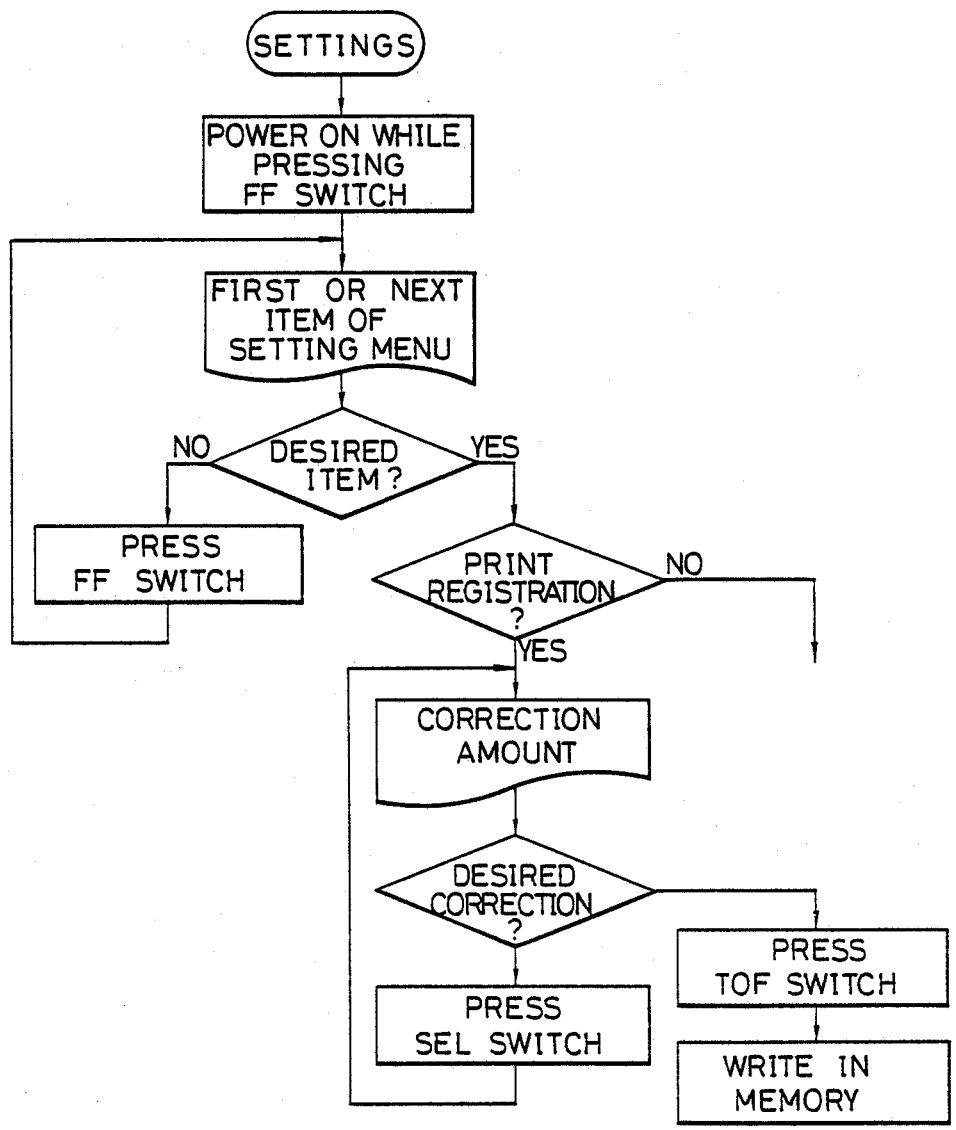
FIG. 8 is a flow chart showing the operations for the setting, particularly of the correction amount.
Figure 9:
FIG. 9 is an example of print produced during the setting of the correction amount.

FIG. 8 shows operations of the CPU when various settings are made. FIG. 9 shows an example of the printing that occurs during the setting. In this example, the setting (or rewriting) of the correction amount is performed in the part of a program that also governs the setting of character pitch, line spacing, etc. Moreover, the switches used for the settings are the same ones that are used for (and primarily intended for) other purposes.

To start the operation in the setting mode the FF switch is pressed. The POW ON switch is also pressed while the FF switch is kept pressed. The items of the setting menu are then printed in turn. When the item of the setting menu that has just been printed is not the one desired, the FF switch (alone this time) is pressed. Then the next item of the setting menu is printed. If the item of the setting menu is the one that is desired, then the operations for setting that item is entered by pressing an appropriate switch.

In FIG. 9 it is assumed that the process of pressing the FF switch for printing the next item of the setting menu is repeated until the message PRINT REGISTRATION is printed.

When the operation for selecting the correction amount is started, correction amounts are printed in turn. If the correction amount that has just been printed is to be selected, TOF switch is pressed. If the correction amount that has just been printed is not to be selected, the SEL switch is pressed so that next correction amount is printed.

To see whether the alignment is correct, a test pattern such as a series of H characters are printed in one direction and then in the other. Comparison of the printed characters that are one above another will show any misalignment and desired correction.

The correction amount is applied to the reverse print trigger generator to alter the number of clock pulses that must be applied before the first trigger signal is produced during backward travel of the printhead.

The correction amount selected in this way and the clock signal from the clock generator 1 are fed to the reverse print trigger generator 4 to generate a trigger signal at a timing that will not give rise to misalignment. Thus the print head is driven to produce correctly aligned printing.

The memory 10 that holds the correction $t_4$ applied to the reverse print trigger generator 4 is backed up by a battery 9, so the selected correction amount is retained even after power is switched off. It is not necessary to reset the correction amount each time power is turned off and on.

Figure 10:
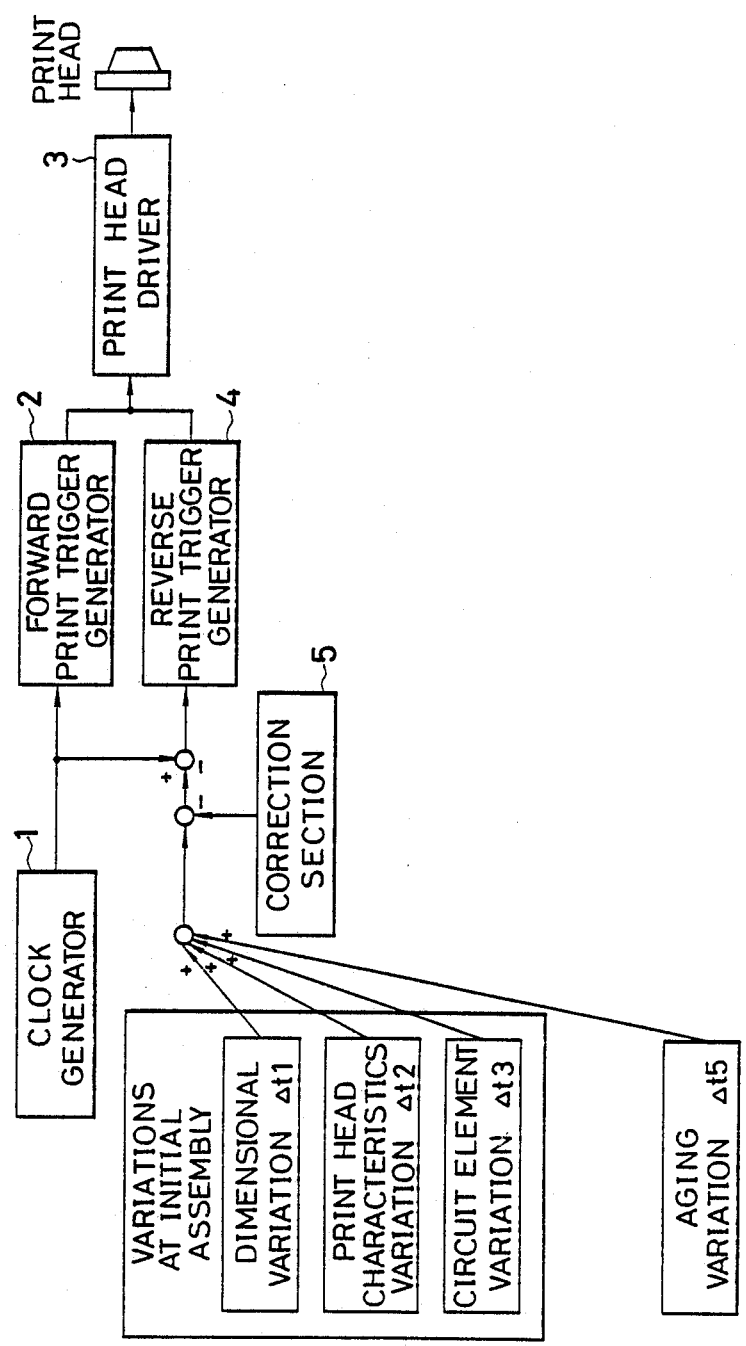
FIG. 10 is a block diagram showing a situation where aging changes must be considered.

FIG. 10 shows a situation where there is an additional factor that also causes misalignment, that is aging variation $\Delta t_5$, measured in seconds. This may for example be due to wear of mechanical parts. When there occurs such a change over use, the correction amount can be rewritten in the same manner as described above. In this situation, the correction amount $\Delta t_4$ should conform to the sum of $\Delta t_1$ to $\Delta t_3$ and $\Delta t_5$, i.e., $$\Delta t_4 = -(\Delta t_1 + \Delta t_2 + \Delta t_3 + \Delta t_5)$$

As explained in the foregoing description, this invention provides a table of bidirectional printing misalignment correction amounts written in a read-only memory, which can be read out by a switch operation. At a correction amount that is considered appropriate, another switch can be pressed to select this correction amount and write the selected correction amount into a rewritable battery-backed-up memory to correct the bidirectional printing alignment. This arrangement simplifies both the setting of the alignment correction amount during initial assembly and the resetting of the alignment correction amount if required due to aging changes after the printer is in the possession of the user.

Since the correction amount is stored in a battery-backed-up memory, the selected correction amount is retained after power is switched off and remains in effect at all times.

What is claimed is:

1. A method for operating a serial dot matrix printer having a print head that is reciprocated along a first direction and stopped for performing bi-directional printing on a medium that is moved in a second direction orthogonal to said first direction, said method comprising the steps of:

storing in a memory device a set of correction amounts for correcting bi-directional printing alignment;

reading and successively printing said correction amounts;

manipulating a key, when a desired correction amount is printed, to input a command signal for registering said desired correction amount in a battery-backed-up memory; and performing said bi-directional printing using said desired correction amount registered in said battery-backed-up memory.

2. A method according to claim 1, wherein said step of reading and successively printing comprises printing one of said correction amounts each time a key is manipulated.

3. A method according to claim 1, further comprising the steps of:

pressing simultaneously a POWER-ON key of said printer and a first key provided on an operation panel of said printer and then pressing a second key on said operation panel to enter a mode for successively printing said correction amounts and registering said desired correction amount.

4. A method according to claim 1, wherein said step of storing in a memory device a set of correction amounts comprises storing said correction amounts in a read only memory

* * * * *